US006291019B1

(12) United States Patent
Locke et al.

(10) Patent No.: US 6,291,019 B1
(45) Date of Patent: Sep. 18, 2001

(54) METHOD FOR DAMPING NOISE, VIBRATION AND HARSHNESS OF A SUBSTRATE

(75) Inventors: Ralph J. Locke, Ft. Myers, FL (US); Daniel W. Irvine, Traverse City, MI (US)

(73) Assignee: Mackinac Investors, LLC, Troy, MI (US)

( * ) Notice: Subject to any disclaimer, the term of this patent is extended or adjusted under 35 U.S.C. 154(b) by 0 days.

(21) Appl. No.: 09/335,115

(22) Filed: Jun. 17, 1999

Related U.S. Application Data

(60) Provisional application No. 60/089,774, filed on Jun. 18, 1998.

(51) Int. Cl.$^7$ ....................................... B05D 1/00
(52) U.S. Cl. .................. 427/385.5; 427/388.1; 427/421; 427/429; 427/435; 524/729; 524/745; 528/65; 528/66
(58) Field of Search .................. 427/421, 426, 427/429, 435, 385.5, 388.1, 388.2; 524/729, 745; 528/65, 66

(56) References Cited

U.S. PATENT DOCUMENTS

| | | |
|---|---|---|
| 3,666,788 | 5/1972 | Rowton . |
| 3,714,128 | 1/1973 | Rowton et al. . |
| 3,979,364 | 9/1976 | Rowton . |
| 4,543,366 | 9/1985 | Smith . |
| 4,595,743 | 6/1986 | Laughner et al. . |
| 4,604,445 | 8/1986 | Kay et al. . |
| 4,607,090 | 8/1986 | Dominquez . |
| 4,631,298 | 12/1986 | Presswood . |
| 4,695,618 | 9/1987 | Mowrer . |
| 4,705,814 | 11/1987 | Grigsby, Jr. et al. . |
| 4,722,946 | 2/1988 | Hostettler . |
| 4,732,919 | 3/1988 | Grigsby, Jr. et al. . |
| 4,806,615 | 2/1989 | Rice et al. . |
| 4,870,150 | 9/1989 | Bandlish et al. . |
| 4,891,086 | 1/1990 | Austin et al. . |
| 4,902,768 | 2/1990 | Gerkin et al. . |
| 4,977,195 | 12/1990 | Gillis . |
| 4,980,386 | 12/1990 | Tiao et al. . |
| 5,013,813 | 5/1991 | Zimmerman et al. . |
| 5,082,917 | 1/1992 | Su et al. . |
| 5,100,997 | 3/1992 | Reisch et al. . |
| 5,118,728 | 6/1992 | Primeaux . |
| 5,124,426 | 6/1992 | Primeaux II et al. . |
| 5,140,090 | 8/1992 | Champion et al. . |
| 5,153,232 | 10/1992 | Primeaux, II . |
| 5,162,388 | 11/1992 | Primeaux, II . |
| 5,171,818 | 12/1992 | Wilson . |
| 5,171,819 | 12/1992 | Su et al. . |
| 5,189,073 | 2/1993 | Humbert et al. . |
| 5,189,075 | 2/1993 | Zimmerman et al. . |
| 5,218,005 | 6/1993 | Zimmerman et al. . |
| 5,266,671 | 11/1993 | Primeaux, II . |
| 5,317,076 | 5/1994 | Primeaux, II . |
| 5,405,218 | 4/1995 | Hyde-Smith . |
| 5,415,499 | 5/1995 | Hyde-Smith et al. . |
| 5,442,034 | 8/1995 | Primeaux, II . |
| 5,464,492 | 11/1995 | Gregory et al. . |
| 5,478,654 | 12/1995 | Hargis et al. ....................... 428/457 |
| 5,480,955 | 1/1996 | Primeaux, II . |
| 5,504,181 | 4/1996 | Primeaux, II . |
| 5,534,295 | 7/1996 | Schlichter et al. . |
| 5,562,586 | 10/1996 | Hyde-Smith . |
| 5,567,259 | 10/1996 | Gregory et al. . |
| 5,595,701 | 1/1997 | MacGregor et al. . |
| 5,616,677 | 4/1997 | Primeaux, II et al. . |
| 5,618,616 | 4/1997 | Hume et al. . |
| 5,618,859 | 4/1997 | Maeyama et al. ..................... 523/201 |
| 5,648,031 | 7/1997 | Sturtevant et al. . |
| 5,688,860 | 11/1997 | Croft ................................. 524/710 |
| 5,731,397 | 3/1998 | Primeaux, II et al. . |
| 5,759,695 | 6/1998 | Primeaux, II . |
| 5,763,734 | 6/1998 | Nachtman et al. . |
| 5,863,664 | * 1/1999 | McCormick et al. ............... 428/500 |
| 5,962,618 | * 10/1999 | Primeaux, II et al. ............... 528/61 |
| 6,153,709 | * 11/2000 | Xiao et al. .......................... 525/528 |

OTHER PUBLICATIONS

Technical Data Sheet for CAB–O–SIL®M–5 Untreated Fumed Silica; 1999 Cabot Corporation (No month).
Technical Data Sheet for CAB–O–SIL®L–90 Untreated Fumed Silica; 1999 Cabot Corporation (No month).
OLIN (Now Lyondell Chemical in Newton Square, PA) Material Safety Data Sheet for Poly–G(R) 55–173, Dec. 14, 1992.
Ameripol Synpol Corporation Polymer Data Sheet for 1006 Crumb; Jan. 1996.
Material Safety Data Sheet; MSDS No. 61150; MSDS Date Jun. 24, 1995; Product name NIAX Catalyst A–1, OSi Specialties, Inc.

(List continued on next page.)

*Primary Examiner*—Shrive P. Beck
*Assistant Examiner*—Jennifer Calcagni
(74) *Attorney, Agent, or Firm*—Young & Basile, P.C.

(57) ABSTRACT

A method for damping vibration of a substrate comprises the step of applying a liquid material onto the substrate in an ambient environment, wherein, after application to the substrate, the material cures substantially instantaneously in the ambient environment. The damping composition usable therefor comprises a resin component and an isocyanate component. The resin component includes a polymer(s) for imparting tensile strength, hardness and flexibility; an optional chain extender(s) for imparting tensile strength, weatherability, flexibility, adhesion to specific substrates, and hardness; and an optional filler for imparting hardness, flexibility, and specific noise, vibration and harshness blocking characteristics to the after-application, cured surface. The isocyanate component of the composition includes an isocyanate quasi-prepolymer(s) based on a uretonimine modified MDI and a high molecular weight polyether polyol having an isocyanate equivalent content of 15.8 % and a 2,4'-isomer content of less than about 15 %; and an optional plasticizer(s) for imparting flexibility.

29 Claims, No Drawings

OTHER PUBLICATIONS

Material Safety Data Sheet; MSDS No. 03341; MSDS Date Feb. 17, 1997; Product name: Silquest A–187 silane, OSi Specialties, Inc.

*Polyurethane Handbook; Chemistry–Raw Materials–Processing–Application–Properties*; 2nd Edition; Edited by Günter Oertel; Hanser/Gardner Publications, Inc., Cincinnati; 1994, pp. 98–104 (No Month).

*The ICI Polyurethanes Book*; Second Edition; George Woods; Published jointly by ICI Polyurethanes and John Wiley & Sons; 1990, pp. 41–45 (No month).

"The Versatility of UOP™ and Clearlink™ Diamines in Polyurethane and Polyurea Systems" by David W. House, Ray V. Scott and John E. Wetherall, UTECH Asia 1996 Conference Paper, 16 pages (No month).

"The Processing of Spray Polyurea Elastomer Systems"; Reprinted From Polyurethanes 92; D.J. Primeaux II and K.C. Anglin; Proceedings of the SPI 34th Annual Technical/Marketing Conference; pp. 598–604 (No date).

Albemarle® Corporation; Technical Data Sheet for ETHA-CURE® 300; 4 pages, date unavailable (No date).

* cited by examiner

METHOD FOR DAMPING NOISE, VIBRATION AND HARSHNESS OF A SUBSTRATE

CROSS-REFERENCE TO RELATED APPLICATION

This application claims the benefit of U.S. Provisional Application Ser. No. 60/089,774, filed Jun. 18, 1998.

BACKGROUND OF THE INVENTION

The present invention relates to a method for damping vibration of a substrate and a composition therefor, and especially, although not exclusively to such a method and composition suitable for use in the automotive industry.

As the automobile has evolved, consumers have become continually more sophisticated and demanding. As such, they require many amenities, above and beyond excellent functionality For example, in luxury automobiles especially, the consumer expects a quiet ride. This feature is of such importance that automobile manufacturers frequently spend millions of dollars on advertising campaigns inundating the media with what a smooth, quiet and plush ride their particular automobiles have.

As such, the automotive industry, as well as the aerospace industry, railway the industries, and the truck and bus industry, have dedicated considerable research and development money to improving on a vehicle's noise, vibration and harshness (NVH) characteristics.

Many means have been attempted in order to solve the problem of vibration in a vehicle. One previous method of damping vibration included the placement of moldings and/or pads in appropriate areas. However, several drawbacks existed to this method in that the moldings and/or pads had to be very precisely precut in order to fit properly. Further, they required time consuming assembly to properly and securely attach the moldings/pads to the respective areas. Due to these drawbacks, the moldings and/or pads were nearly cost prohibitive in many cases.

Another solution was to spray epoxy or water born plastisols in liquid form onto (for example, in the automotive industry) a body in white. These sound damping compositions were sprayed wet and remained wet until they were cured. However, curing the plastisol on the body in white required heating. This resulted in several drawbacks, a few of which are that the plastisol composition would drip off and could contaminate the paint and/or E-coat system. Further, this composition could only go on the automotive body at a particular point in the assembly process, namely relatively soon before the body was to be put in the oven for baking (since the plastisol required heat for curing).

Accordingly, an object of the present invention is to provide a new and improved method for damping vibration of a substrate which does not require heating or other specialized process steps. It is a further object of the present invention to provide such a method which is simple and cost effective. It is yet a further object of the present invention to provide such a method which requires very little time in the assembly process and advantageously will not contaminate the vehicle paint or E-coat system. Still further, it is an object of the present invention to provide such a method which may be used at any point in the assembly process, eg. at the metal stamping stage up to and including the body in white stage, and either before or after the application of primer to the body in white.

It is also an object of the present invention to provide a composition which will damp vibration of a substrate, which composition advantageously cures substantially instantaneously in an ambient environment. Yet another object of the present invention is to provide such a composition which does not substantially release volatile organic materials.

SUMMARY OF THE INVENTION

The present invention addresses and solves the problems/drawbacks enumerated above, and encompasses other features and advantages as well. The present invention comprises a method for damping vibration of a substrate which comprises the step of applying a liquid material onto the substrate in an ambient environment, wherein, after application to the substrate, the material cures substantially instantaneously in the ambient environment.

A damping composition usable therefor comprises two components. The first component (ie. the resin component) consists essentially of a polymer and/or a blend of polymers present in an amount sufficient to impart a predetermined amount of tensile strength, hardness and flexibility; optionally, a chain extender and/or a blend of chain extenders present in an amount sufficient to impart a predetermined amount of tensile strength, weatherability, flexibility, adhesion to specific substrates, and hardness; and optionally, a filler and/or blend of fillers present in an amount sufficient to impart a predetermined amount of hardness, flexibility, and specific noise, vibration and harshness blocking characteristics to the after-application, cured surface.

The second component (ie. the isocyanate component) of the composition may consist essentially of isocyanate quasi-prepolymers based on a uretonimine modified MDI and a high molecular weight polyether polyol having an isocyanate equivalent content of 15.8% and a 2,4'-isomer content of less than about 15%. The second component may optionally also consist essentially of a plasticizer and/or a blend of plasticizers present in an amount sufficient to impart a predetermined amount of flexibility.

DETAILED DESCRIPTION OF THE PREFERRED EMBODIMENTS

The method according to the present invention comprises the step of applying a liquid material onto the substrate in an ambient environment. It is to be understood that "ambient environment" as used herein may be the environment wherever the substrate is located and/or assembled, processed or otherwise manipulated, eg. an automotive assembly factory, an aeronautical factory, a stamping plant, etc.; and it is to be further understood that the present method and composition will achieve the stated objects and advantages in substantially any such "ambient environment." However, it is preferred that the ambient temperature range between about 35° F. (1.7° C.) and about 160° F. (71.1° C.); it is more preferred that the ambient temperature range between about 50° F. (10° C.) and about 120° F. (48.9° C.); and it is most preferred that the ambient temperature range between about 70° F. (21.1° C.) and about 95° F. (35° C.). It is preferred that the ambient pressure range between about 730 mm Hg and about 800 mm Hg; however, it is more preferred that the ambient pressure range between about 750 mm Hg and about 780 mm Hg.

After application to the substrate, the liquid material cures substantially instantaneously on the substrate in the ambient environment. The curing time of the present invention preferably ranges between about 15 seconds and about 20 seconds, but can be as low as 2 seconds or as high as 30 minutes while still within the scope of the present invention and providing the advantages stated herein.

It is to be understood that the substrate may comprise any suitable substrate, including, but not limited to, metal stampings, bodies in white either before or after application of primer coat(s), carbon graphite composites, fiberglass, polycarbonates, ABS, and any other structural polymeric materials. As used herein, "body in white" is intended to mean a vehicle body assembled with all paintable components thereon, but without trim work or any other components which are not painted.

It is to be understood that the application step may comprise any suitable application means such as, for example, spraying, dipping, brushing, and it may be desired to utilize suitable hoods, ventilation means, and/or standard paint style spray booths. It is to be further understood that any of the application means may be performed either manually and/or automatically and/or robotically.

In a preferred embodiment, the application means is a conventional two component spray system, accommodating the first component and the second component of the composition of the present invention. In a more preferred embodiment, the application means is a high pressure, impingement mix spray system. One such suitable spray system is commercially available from GUSMER Corporation, and is described in a technical paper entitled, "The Processing of Spray Polyurea Elastomer Systems," D. J. Primeaux II and K. C. Anglin, 34th Annual Polyurethane Technical/Marketing Conference, Oct. 21–24, 1992, pp. 598–604, which paper is incorporated herein by reference.

The method of the present invention renders many advantages, including, but not limited to, the elimination of a process step, namely heating in order to cure the applied liquid material. Since the material to be applied is liquid, it is relatively simple to apply to the substrate. However, since it cures substantially instantaneously, virtually none of the applied material comes off to contaminate paint and/or the E-coat system. Further, since the applied material does not need any further process steps in order to cure, it may be applied at any point in the assembly process, eg. from a metal stamping up to and including the body in white, either before or after primer has been applied thereto. However, it may be desirable in the present invention to apply the liquid material after primer has been applied.

It is to be understood that the vibration(s) damped by the method of the present invention may be audible (sound/noise) vibrations, tactile vibrations, and/or non-tactile vibrations (eg. "body boom"). However, the method and composition of the present invention may be especially suitable for damping vibrations within audible frequencies.

The composition according to the present invention is suitable as a noise, vibration and/or harshness damping liquid material. Broadly speaking, the inventive composition comprises a first (eg. resin) component and a second (eg. isocyanate) component. More particularly, the present inventive elastomer systems may include the reaction product of, for example: an amine-terminated polyether, or a hydroxy-terminated polyether, or blends of the two as an active hydrogen containing material; and an isocyanate compound to produce a polyurea, polyurethane or hybrid elastomer.

The first component consists essentially of a polymer and/or a blend of polymers present in an amount sufficient to impart, through reaction with an appropriate isocyanate compound (from the second component of the composition), a predetermined amount of tensile strength, hardness and flexibility properties that are required for a given application. These materials represent the backbone of the composition. It is to be understood that any suitable polymers may be used. However, in the preferred embodiment, the polymers are selected from the group consisting of polyoxypropylene diols, polyoxypropylene triols, polyester polyols (di, tri, quad, penta, etc. functional), polyether polyols (di, tri, quad, penta, etc. functional), and mixtures thereof.

The active amine hydrogen containing materials useful in the present invention may be chosen from amine-terminated polyethers. Preferably, the amine-terminated polyethers are selected from aminated diols or triols and, more preferably, may include a blend of aminated diols and/or triols. More preferably, the amine-terminated polyethers are selected from mixtures of high molecular weight polyols, such as mixtures of di-and trifunctional materials. However, a single high molecular weight aminated polyol can be used. It is to be understood that high molecular weight amine-terminated alkylenes and simple alkyl amines are also included within the scope or this invention, and may be used alone or in combination with the aforementioned amine-terminated polyols. In addition, other amine-terminated materials having different molecular weights or different chemical compositions may be used.

Especially preferred are amine-terminated polyethers, including primary and secondary amine-terminated polyethers of greater than about 1,500 average molecular weight, having a functionality of from about 2 to about 6, preferably from about 2 to about 3, and an amine equivalent weight of from about 750 to about 4,000. Mixtures of amine-terminated polyethers may be used. In a preferred embodiment, the amine-terminated polyethers have an average molecular weight of at least about 2,000. These materials may be made by various methods known in the art.

The amine-terminated polyethers useful in this invention may be, for example, polyether resins made from an appropriate initiator to which lower alkylene oxides, such as ethylene oxide, propylene oxide, butylene oxide, or mixtures thereof, are added with the resulting hydroxyl-terminated polyol then being aminated. When two or more oxides are used, they may be present as random mixtures or as blocks of one or the other polyether. In the amination step, it may be highly desirable that the terminal hydroxyl groups in the polyol be essentially all secondary hydroxyl groups for ease of amination. The polyols so prepared are then reductively aminated by known techniques, such as, for example, those described in U.S. Pat. No. 3,654,370, which is incorporated herein by reference. Normally, the amination step does not completely replace all of the hydroxyl groups. However, a majority of hydroxyl groups are replaced by amine groups. In a preferred embodiment, the amine-terminated polyether resins useful in this invention have greater than about 90 percent of their active hydrogens in the form of amine hydrogens.

It is to be understood that many high molecular weight amine-terminated polyethers or simply polyether amines may be used as the polymer and/or part of the polymer blend in the first component of the composition of the present invention. Particularly preferred are the JEFFAMINE® brand series of polyether amines available from Huntsman Petrochemical Corporation in Houston, Tex. This series includes JEFFAMINE® D-2000 (an amine-terminated polyoxypropylene diol of 2000 molecular weight), JEFFAMINE® D-4000, JEFFAMINE®T-3000 (an amine-terminated polyoxypropylene triol of 3000 molecular weight) JEFFAMINE® T-5000 (an amine-terminated polyoxypropylene triol of 5000 molecular weight), JEFFAMINE® T-403 (an amine-terminated polyoxypropylene triol of 400 molecular weight), and JEFFAMINE® D-230 (an amine-terminated polyoxypropylene diol of 230 molecular weight). These polyetheramines are described with particularity in Huntsman Corporation's product brochure entitled "The JEFFAMINE® Polyoxyalkyleneamines." The JEFFAMINES are amine-terminated polyoxypropylenes, the "D" designates a diamine, the "T" designates a triamine, and the number extension designates the molecular weight.

It is to be understood that the term "high molecular weight" is intended to include polyether amines having a molecular weight of at least about 1000. For the diamines, a suitable molecular weight may range between about 1000 and about 4000. For the triamines, a suitable molecular weight may range between about 2000 and about 6000.

Other polymer materials suitable for use in the first component of the composition of the present invention include the following. VORANOL 230–660 triol is a polyether polyol commercially available from Dow Chemical Company in Midland, Mich. VORANOL 230–660 has an average molecular weight of 250; a typical hydroxyl number of 660; a functionality of 3; an average hydroxyl content of 20.0%; and a maximum water content of 0.05%. VORANOL 220–056 diol is a polyether polyol commercially available from Dow Chemical Company in Midland, Mich. VORANOL 220–056 has an average molecular weight of 2000; a typical hydroxyl number of 56; a functionality of 2.0; an average hydroxyl content of 1.70%; and a maximum water content of 0.06%. Ethylene glycol may successfully be used, as may polypropylene glycol (PPG) having an average molecular weight of about 2000. One suitable PPG-2000 product is commercially available from Huntsman Corporation under the tradename JEFFOX® PPG-2000. POLY-G 55–173 is a polyether diol commercially available from Lyondell Chemical in Newtown Square, Pa. More specifically, POLY-G 55–173 is a hydroxyl terminated poly(oxyalkylene) polyol. THANOL®SF-5505 is a 5500 molecular weight polyether triol containing approximately 80% primary hydroxyl groups, and is commercially available from Lyondell Chemical in Newtown Square, Pennsylvania. 1,4-Butane diol may also be used; and one such suitable compound is commercially available from Lyondell Chemical under the tradename 1,4-BDO. BASF in Mount Olive, N.J. also supplies a suitable 1,4-Butane diol.

It is to be understood that the polymer(s) of the first component of the composition of the present invention may be present in any amount sufficient to achieve desired degrees of the characteristics mentioned hereinabove. These compounds contribute to the amount of cross link density imparted to the composition, as well as to the amount of rigidity or softness imparted to the composition. However, in the preferred embodiment, these may comprise between about 0 wt % and about 100 wt. % of the first component of the composition. More preferably, these range between about 20 wt % and about 80 wt. % of the first component of the composition. In a preferred embodiment, the polymer or a blend of the polymers may be present in an amount ranging between about 40 wt % and about 80 wt. % of the first component of the composition.

The first component of the composition of the present invention may further optionally comprise a chain extender and/or a blend of chain extenders present in an amount sufficient to impart a predetermined amount of tensile strength, weatherability, flexibility, adhesion to specific substrates, and hardness to the overall system. The chain extender (s) may also adjust the reaction rates of the overall system. Suitable chain extenders are selected from the group consisting of dialkyl substituted methylene dianiline, diethyltoluene diamine, substituted toluene diamines, and mixtures thereof. Other suitable chain extenders may include amine terminated aliphatic chain extenders selected from (but not limited to) the group consisting of cyclohexane diamine, isophorone diamine, and mixtures thereof. Other suitable chain extenders may include low molecular weight glycol type chain extenders, such as for example, 1,4-butane diol.

It is to be understood that any suitable chain extenders may be used in the present invention. In the preferred embodiment, DETDA (diethyltoluene diamine) is used. One such suitable material is sold under the tradename ETHACURE® 100, which is a diethyltoluene diamine chain extender commercially available from Albemarle Corporation located in Baton Rouge, La. Another suitable material is sold under the tradename ETHACURE® 300, which is a di(methylthio) toluenediamine chain extender, also commercially available from Albemarle Corporation located in Baton Rouge, La.

Another preferred chain extender is UNILINK® 4200, which is a dialkyl substituted methylene dianiline chain extender commercially available from UOP Chemical Company located in Des Plaines, Ill. It has been discovered in the present invention that the addition of this dialkyl substituted methylene dianiline chain extender to the DETDA provides advantageous and desirable increases in tensile strength and flexibility while extending the system cure times. This liquid secondary diamine based on methylene dianiline is discussed in the technical paper entitled, "The Versatility of UOP UNILINK and CLEARLINK Diamines in Polyurethane and Polyurea Systems," David W. House, Ray V. Scott and John E. Wetherall, UTECH Asia 1996 Conference papers, 16 pages (the substance of which is also published by the same authors under the title, "The Versatility of Secondary Diamines in Polyurethane and Polyurea Systems," available from UOP Chemical Company located in Des Plaines, Ill., pp. 1–13), which paper is incorporated herein by reference. Another preferred chain extender is UNILINK® 4100, which is a dialkyl substituted diaminobenzene chain extender commercially available from UOP Chemical Company located in Des Plaines, Ill. Another available chain extender is UNILINK 4300 (a blend derived from UNILINK 4100 and UNILINK 4200), also from UOP.

Further suitable chain extenders include AMP 95, AMP 75, and AMP REGULAR, commercially available from Angus Chemicals located in Buffalo Grove, Ill. These are difunctional products, having a primary amine end group and a primary hydroxyl end group. These impart extended cure times to the system, resulting in a slower cure time, eg. between about 60 seconds and about 240 seconds.

It is to be understood that the chain extenders may be present in any desired amounts sufficient to impart the predetermined characteristics described hereinabove. In the preferred embodiment, the chain extenders are present in an amount ranging between about 0 wt. % and about 60 wt. % more preferably in an amount ranging between about 5 wt. % and about 50 wt. %, and even more preferably in an amount ranging between about 20 wt. % and about 30 wt. % of the first component of the composition.

The first component of the composition of the present invention may further optionally consist essentially of a filler and/or blend of fillers present in an amount sufficient to impart a predetermined amount of hardness, flexibility, and specific noise, vibration and harshness blocking characteristics to the after-application, cured surface. In the past, the use of filler(s)/filler systems in conventional polyurea amine (PUA) spray systems had generally been considered bad practice and thus avoided due in part to undesirable wear of metal components inside the spray equipment used. However, it has been fortuitously and unexpectedly discovered that wear on metal components inside the spray equipment may successfully be minimized, if desired and/or necessary. Without being bound to any theory, it is believed that this undesirable wear is minimized if the filler has an acceptably low hardness value and/or an acceptably small particle size.

It is to be understood that any fillers, filler systems, reinforcing filler systems, or the like may be used in the present invention, as desired, as long as such materials are suitable for use in the present invention as described herein. Some suitable fillers may include, but are not limited to, barium sulfate, calcium carbonate, clay, talc, aluminum silicate, titanium dioxide, nitrile rubber, butyl rubber, synthetic rubbers (eg. styrene butadiene rubber (SBR) crumb rubber), chopped fiberglass, Wollastonite (calcium metasilicate), KEVLAR (commercially available from E. I. du Pont de Nemours Company), any suitable fibrous filler, fumed silica (also can be used as a thixotrope), and mixtures thereof.

Barium sulfate is commercially available from many sources, one of which is Hitox Corp. in Corpus Christi, Tex. under the tradename BARTEX 10.

A suitable synthetic crumb rubber is commercially available under the tradename 1006 CRUMB from Ameripol Synpol Corp. in Akron, Ohio. Some properties of the 1006 CRUMB include the following. 1006 CRUMB is a light-colored polymer and is in free flowing crumb form which eliminates the need for milling, cutting or grinding. The crumb particles retain the porous nature of the coagulated rubber and can be dissolved in a solvent faster than milled or pelletized bale rubber. The crumb size, retained on ¼" screen is 1.0% max; and less than 16 mesh is 28.0% max.

One suitable fumed silica is commercially available under the tradename CAB-O-SIL M-5 UNTREATED FUMED SILICA from Cabot Corporation in Billerica, Mass. The CAB-O-SIL M-5 has a pH (4% slurry) of 3.7–4.3; a 325 mesh residue (44 microns) of 0.02 max %; a specific gravity of 2.2 g/cm$^3$; an assay (% $SiO_2$) greater than 99.8; and an average particle (aggregate) length of 0.2–0.3 microns.

The fillers may increase impact resistance and tensile strength. These compounds may also be used in the composition to modify hardness, flexibility and to provide specific noise and vibration blocking characteristics.

In the preferred embodiment, these filler(s) may range between about 0 wt. % and about 40 wt. %, more preferably may range between about 5 wt. % and about 25 wt. %, and even more preferably may range between about 15 wt. % and about 20 wt. % of the first component of the composition. In one preferred embodiment, the filler, eg. calcium carbonate, may comprise about 10.0 wt. % of the first component of the composition. In an alternate preferred embodiment, the filler, eg. barium sulfate, may comprise about 20 wt. % of the first component of the composition.

The first component of the composition of the present invention may further optionally consist essentially of any suitable colorants, pigments, or the like, as desired. Some non-limitative examples of such materials are selected from the group consisting of carbon black, titanium dioxide, iron oxide (a suitable iron oxide is commercially available under the tradename RED OXIDE from Harcros Chemicals, Inc. in Kansas City, Kans.), organic pigments and dyes, and mixtures thereof. These compounds are used primarily to impart a specific color to the composition. However, in some instances, carbon black and titanium dioxide, for example, may also affect the hardness of the system.

The first component of the composition may further optionally consist essentially of a catalyst and/or a blend of catalysts. These compounds are used to either increase or decrease the inherent reaction rate of the resin:isocyanate system. In systems where two or more polymers and chain extenders are used, the catalyst(s) may also be used to promote a specific reaction order.

Suitable catalysts are tertiary amines selected from the group consisting of triethylamine, tributylamine, N-methylmorpholine, N-ethylmorpholine, N-cocomorpholine, N,N,N',N'-tetramethylethylene diamine, and mixtures thereof. Other suitable catalysts are organometallic catalysts selected from the group consisting of organic tin catalysts such as tin-(II) salts of carboxylic acids (eg. tin-(II)-laurate), dialkyl tin salts of carboxylic acids (eg. dibutyltindilaurate), and mixtures thereof. It is to be understood that the organometallic catalysts may be used alone or in combination with tertiary amines.

Other catalysts which would be suitable are known to those skilled in the art. See, for example, Carl Hanser Verlag, *Kunstoff Handbuch,* Volume VII, published by Vieweg and Hochtlen, Munich, Germany, pp. 96–102 (1966), which is incorporated herein by reference.

If catalyst(s) are used, it is preferred that it/they be present in an amount ranging between about 0.001 wt % and about 10 wt % (based on the resin component); and more preferably between about 0.05 wt % and about 1 wt % (based on the resin component).

Water may be used as a blowing agent in the foaming of the polyurea elastomer of the present invention. More specifically, it is believed that the water reacts with the isocyanate employed in the second component to produce an amine and carbon dioxide. The $CO_2$ liberated in the foregoing reaction is what "blows" the foam. This is described more fully in U.S. Pat. No. 5,153,232 (mentioned hereinbelow). Blowing catalysts, such as those described below, are employed to promote or enhance the reaction.

The amount of water used in the first component of the system, based on total weight of the first component, typically ranges from about 1 wt. % to about 8 wt. %. Preferably, the amount of water ranges from about 1 wt. % to about 4 wt. %. The catalysts used to promote the reaction described above are ones known to those skilled in the art. Particularly preferred are tertiary amine catalysts. Some suitable catalysts are 2,2'-dimorpholinediethyl ether, N,N,N'-trimethyl-N'-hydroxyethyl-bisaminoethyl ether, and mixtures thereof. Another suitable catalyst is commercially available under the tradename NIAX CATALYST A-1 from OSi Specialties, Inc. in Danbury, Conn. This is a tertiary amine/glycol mixture which is a clear, colorless liquid having an amine odor; is completely soluble in water; has a boiling point (at 760 mm Hg) of 190° C. (374° F.); and has a density of 0.902. NIAX CATALYST A-1 imparts a faster blowing and cure time to the system.

A cell stabilizer or surfactant may optionally be added to the first component to provide cell stabilization. Particular foam stabilizers are those described in U.S. Pat. No. 4,907,705, which is incorporated herein by reference. These surfactants are generally polysiloxane polyether block copolymers. Generally, the surfactant is employed in an amount of between about 0.5 wt. % and about 2.5 wt. % (based on the first component), and more preferably between about 0.5 wt. % and about 0.75 wt. % (based on the first component). When the cell stabilizer/surfactant is introduced into the first component of the composition of the present invention, a substantially closed cell polyurea foamed elastomer is formed. The water or blowing agent is added to produce a foamed system with approximately a 25–35 pound per cubic foot density.

The first component of the composition may further optionally consist essentially of an adhesion promoter and/or a blend of adhesion promoters. These compounds may be used to promote the adhesion of the inventive spray system to a specific type of substrate. In a preferred embodiment, adhesion to untreated, E-Coated or painted metal may be greatly improved by the addition of between about 0 pbw (parts by weight) and about 0.25 pbw of an organosilane compound, preferably between about 0.05 pbw and about 0.25 pbw of an organosilane compound; and more preferably between about 0.01 pbw and about 0.15 pbw of an organosilane compound such as, for example, epoxy silane compounds, to the first component of the composition.

One such suitable adhesion promoting material is commercially available under the tradename SILQUEST A-187 SILANE from OSi Specialties, Inc. in Danbury, Conn. This is a gamma-glycidoxypropyl-trimethoxysilane which is a clear, pale liquid having an ester odor; reacts slowly in water; has a boiling point (at 760 mm Hg) of 290° C. (554° F.); and has a density of 1.069.

Other examples of suitable adhesion promoters include amino alkoxy silanes and vinyl alkoxy silanes, such as those described in U.S. Pat. No. 5,731,397, which is incorporated herein by reference.

The second component of the composition of the present invention may consist essentially of isocyanates. It is to be understood that any suitable isocyanates may be used. Both aromatic and aliphatic isocyanates can be used in the present invention. The aliphatic isocyanates employed in the present invention are those known to one skilled in the polyurea elastomer art. Thus, for instance, the aliphatic isocyanates may be of the type described in U.S. Pat. No. 5,162,388, which is incorporated herein by reference. Accordingly, they are typically aliphatic diisocyanates and, more particularly, are the bifunctional monomer of the tetraalkyl xylene diisocyanate, such as the tetramethyl xylene diisocyanate, or the trimerized or the biuret form of an aliphatic diisocyanate, such as hexamethylene diisocyanate. Also, cylcohexane diisocyanate and isophorone diisocyanate are considered preferred aliphatic isocyanates. Other useful aliphatic polyisocyanates are described in U.S. Pat. No. 4,705,814, which is incorporated herein by reference. It is to be understood that the aforementioned isocyanates may be used alone or in combination.

A wide variety of aromatic polyisocyanates may also be utilized to produce the polyurea elastomer of the present invention. Typical aromatic polyisocyanates include p-phenylene diisocyanate, polymethylene polyphenylisocyanate, 2,6-toluene diisocyanate, 2,4-toluene diisocyanate, naphthalene-1,4-diisocyanate, bis-(4-isocyanatophenyl)-methane, and bis-(3-methyl-4-isocyanatophenyl)methane. Other aromatic isocyanates used in the practice of this invention are methylene-bridged polyphenyl polyisocyanate mixtures, which have functionalities of from about 2 to about 4. These aromatic isocyanates are described in the literature and in many patents, for example, U.S. Pat. Nos. 2,683,730; 2,950,263; 3,012,008; 3,344,162; and 3,362,979, all of which are incorporated herein by reference.

Usually methylene-bridged polyphenyl polyisocyanate mixtures contain from about 20 wt % to about 100 wt % methylene diphenyl diisocyanate isomers, with the remainder being polymethylene polyphenyl diisocyanate having higher functionalities and higher molecular weights. Typical of these are polyphenyl polyisocyanate mixtures containing from about 20 wt % to about 100 wt % diphenyldiisocyanate isomers, of which from about 20 wt % to about 95 wt % thereof is the 4,4'-isomer, with the remainder being polymethylene polyphenyl polyisocyanates of higher molecular weight and functionality that have an average functionality of from about 2.1 to about 3.5. These isocyanate mixtures are known, commercially available materials, and may be prepared by the process described in U.S. Pat. No. 3,362,979.

By far the most preferred aromatic polyisocyanate is methylene bis(4-phenylisocyanate) or "MDI." Pure MDI, quasi-prepolymers of MDI, and modified pure MDI, etc., are useful. Materials of this type may be used to prepare suitable elastomers. Since pure MDI is a solid and, thus, inconvenient to use, liquid products based on MDI are also disclosed as suitable for use in the present invention. For example, U.S. Pat. No. 3,394,164, which is incorporated herein by reference, describes a liquid MDI product. More generally, uretonimine modified pure MDI is also included. This product is made by heating pure distilled MDI in the presence of a catalyst. Examples of commercial materials of this type are ISONATE® 125M (pure MDI), ISONATE® 2143L (a liquid uretonimine-modified methylenediisocyanate product), RUBINATE® 1680 (a liquid uretonimine-modified methylenediisocyanate product), RUBINATE® 1209, RUBINATE® 9009 (an aromatic isocyanate quasi-prepolymer), RUBINATE® 9015 (an aromatic isocyanate quasi-prepolymer), and RUBINATE® M ("liquid" MDI's). The ISONATE® products are available from Dow Chemical Co. in Midland, Mich., and the RUBINATE® products are available from ICI Polyurethanes located in West Deppford, N.J. Preferably, the amount of isocyanate used to produce the present polyurea elastomers is equal to or greater than the stoichiometric amount based on the active hydrogen ingredients in the formulation.

It is understood that the term "isocyanate" also includes quasi-prepolymers of isocyanates with active hydrogen-containing materials. The active hydrogen-containing materials used to prepare a prepolymer can include a polyol or a high molecular weight amine-terminated polyether, also described herein as amine terminated alkylenes, or a combination of these materials. The amine-terminated polyethers useful in preparing quasi-prepolymers of isocyanates include the same amine-terminated polyethers described hereinabove as amine-terminated materials for producing polyureas.

The polyols useful in preparing a quasi-prepolymer include polyether polyols, polyester diols, triols, etc., having an equivalent weight of at least 500, and preferably of at least about 1,000 to about 5,000. Those polyether polyols based on trihydric initiators of about 4,000 molecular weight and above are especially preferred. The polyethers may be prepared from ethylene oxide, propylene oxide, butylene oxide or a mixture of propylene oxide, butylene oxide and/or ethylene oxide. Other high molecular weight polyols that may be useful in this invention are polyesters of hydroxyl-terminated rubbers, e.g., hydroxyl terminated polybutadiene. Quasi-prepolymers prepared from hydroxyl-terminated polyols and isocyanates are generally reserved for use with aromatic polyurea elastomer systems.

These same polyols may also be employed as the active hydrogen containing material for preparation of the elastomer system. The polyols may also be blended with the amine-terminated resins described previously.

The ratio of equivalents of isocyanate groups in the polyisocyanate to the active hydrogens, preferably amine hydrogens, is in the range of about 0.95:1 to about 2.00:1; with about 1.00:1 to about 1.50:1 being preferred; and about 1.05:1 to about 1.30:1 being most preferred. This ratio is sometimes referred to as the isocyanate INDEX and is expressed as a percentage of excess isocyanate. The isocyanate INDEX compares the total isocyanate with the total active hydrogen in the reactant compounds.

In the present invention, a preferred isocyanate is an isocyanate quasi-prepolymer based on a uretonimine modified methylene diisocyanate (MDI) and a high molecular weight polyether polyol having an isocyanate content of about 15.8% and a 2,4'-isomer content of less than about 10%. One such suitable isocyanate quasi-prepolymer is RUBINATE® 9009, mentioned hereinabove. Other suitable isocyanate compounds include the following. MONDUR® ML, which is a liquid uretonimine-modified methylenediisocyanate product, is commercially available from Bayer Corporation in Pittsburgh, Pa. MONDUR® 1437, also commercially available from Bayer, is an aromatic isocyanate quasi-prepolymer. VESTANAT® IPDI is an isophorone diisocyanate commercially available from Creanova Spezialchemie GmbH, a Hüls, Group Co. in Marl, Germany. m-TMXDI® is an M-tetramethylxylene diisocyanate commercially available from Cytec Industries in West Paterson, N.J.

The second component of the composition of the present invention may also optionally consist essentially of a plasticizer and/or a blend of plasticizers. It is to be understood that any suitable plasticizer(s) may be used in conjunction with the present invention. U.S. Pat. No. 5,442,034, which is incorporated herein by reference, teaches that alkylene carbonates may be incorporated in the isocyanate quasi-prepolymer for improved mixing characteristics of the polyurea elastomer system. The preferred alkylene carbonates include ethylene carbonate, propylene carbonate, butylene carbonate and dimethyl carbonate, or mixtures thereof. In the preferred embodiment, JEFFSOL™ PC is used, which is a propylene carbonate commercially available from Huntsman Petrochemical Corporation located in Houston, Tex.

It is to be understood that the plasticizer may be present in an amount sufficient to impart a predetermined amount of flexibility and improved mixing characteristics. In the preferred embodiment, this plasticizer ranges between about 0 wt. % and about 40 wt. %; and more preferably ranges between about 5 wt. % and about 30 wt. % of the second component of the composition. In a more preferred embodiment, this plasticizer comprises between about 5.0% and about 10% of the second component of the composition.

The amine terminated polyethers, isocyanates, and chain extenders that may be used in accordance with the present invention are those known in the polyurea art as described in U.S. Pat. Nos. 4,891,086; 5,013,813; 5,082,917; 5,153,232; 5,162,388; 5,171,819; 5,189,075; 5,218,005; 5,266,671; 5,317,076; and 5,442,034, all of which are incorporated herein by reference.

The compositions of the present invention may be easily applied in liquid form by any suitable application means onto a substrate, such means including, but not limited to spraying, dipping, and/or brushing. Although these compositions advantageously do not substantially emit volatile organic materials, it may be desirable to utilize suitable hoods, ventilation means, and/or standard paint style spray booths. It is to be further understood that any of the application means may be performed either manually and/or automatically and/or robotically.

In a preferred embodiment, the application means is a conventional two component spray system, accommodating the first component and the second component of the composition of the present invention. In a more preferred embodiment, the application means is a high pressure, impingement mix spray system. One such suitable spray system is commercially available from GUSMER Corporation, as described hereinabove. The first and second components are delivered from separate chambers of a proportioning unit and are impacted or impinged upon each other to effectuate and initiate mixing of the components. This forms the elastomer system, which is then coated onto the desired substrate via a spray gun.

Heretofore, traditional spray polyurea amine (PUA) systems have been used primarily as a protective coating membrane, and have been more suited toward a field applied application rather than an in-house application. As such, traditional PUA systems had not been used in, for example, the automotive industry, as a noise, vibration and/or harshness damping liquid material. It is believed that the reasons for this are several. The PUA chemistry is an art/field quite diverse from industries seeking to improve upon NVH characteristics. Further, these industries have believed that, unless moldings and/or pads were used, a thermosetting system cured in E-Coat ovens was the only effective way to achieve necessary and/or desired NVH properties (however, the present inventive disclosure has shown the contrary). However, as mentioned above, liquid systems that rely on the E-Coat ovens to effect a cure are prone to causing contamination in the E-Coat dip tanks; and the moldings/pads have the drawbacks mentioned above.

It is believed that a further reason why traditional spray polyurea systems had not heretofore been used for NVH attenuation is the relative high cost (as compared to traditional materials used for NVH attenuation) of the traditional spray polyurea amine raw materials. As such, manufacturers may have believed (if spray polyurea systems had come to their attention at all) that the use of such polyurea spray systems was cost prohibitive. However, it has been unexpectedly and fortuitously discovered that this may simply be a "perceived" higher cost. Due to the many advantages of the process and composition of the present invention (eg. no heating or other specialized process steps required; very little time required in the assembly process; substantially no contamination of the vehicle paint or E-coat system; and may be used at any point in the assembly or pre-assembly process), the manufacturer may not spend any more with the process of the present invention than with conventionally used NVH attenuating materials/processes. In fact, due to the many enumerated advantages, the manufacturer may actually save money with the process of the present invention than with conventionally used NVH attenuating materials/processes.

It is further believed that the use of one or more of the fillers mentioned hereinabove which may effectively block NVH transmission, taken in conjunction with the above-enumerated advantages, may bring the perceived higher cost of the inventive PUA raw materials down, while at the same time providing the same or better NVH attenuation than do materials traditionally used for NVH attenuation (eg. moldings and/or pads; sprayed epoxy or water born plastisols in liquid form; and the like).

The present invention has successfully and advantageously improved upon PUA technology, and, in the preferred embodiment, has combined this with a robotic application and with improved spray equipment capable of producing tight, well defined spray patterns to produce substrates having adequate and/or improved NVH characteristics (as compared to materials traditionally used for NVH attenuation).

To further illustrate the present invention, the following examples are given. It is to be understood that these examples are provided for illustrative purposes and are not to be construed as limiting the scope of the present invention.

EXAMPLE I

A composition according to the present invention was made in the following manner. The following compounds in the stated weight percentages were admixed to form the first component:

| | |
|---|---|
| JEFFAMINE D-2000 | SILQUEST A-187 |
| 58.4 pbw | 0.8 pbw |
| TITANIUM DIOXIDE | ETHACURE 100 |
| 1.0 pbw | 21.9 pbw |
| BARIUM SULFATE | |
| 19.7 pbw | |

The resultant composition was a liquid material under ambient conditions and had a viscosity suitable for spraying processes.

The second component of the composition of the present invention comprised a liquid isocyanate composition comprised of 95 wt. % RUBINATE 9009 and 5.0 wt. % JEFFSOL PC, and had a viscosity under ambient conditions suitable for spraying processes.

EXAMPLE II

A composition as prepared in Example I was placed in a suitable two component spraying device, the first component being placed in a first suitable vessel, and the second component being placed in a second suitable vessel. An automotive body in white is sprayed with the two component liquid composition. After application, the applied liquid composition cures on the body in a time interval between about 15 seconds and 20 seconds. After curing, the composition leaves a substantially smooth finish on the body in white. The automotive body in white having the cured composition thereon exhibits enhanced damping of noise, vibration and harshness, including vibrations both within and outside of the audible frequencies.

EXAMPLE III

A composition as prepared in Example I is placed in a suitable two component spraying device, the first component being placed in a first suitable vessel, and the second component being placed in a second suitable vessel. A metal stamping is sprayed with the two component liquid composition. After application, the applied liquid composition cures on the stamping in a time interval between about 15 seconds and 20 seconds. After curing, the composition leaves a substantially smooth finish on the metal stamping. The metal stamping exhibits enhanced damping of noise, vibration and harshness, including vibrations both within and outside of the audible frequencies.

EXAMPLE IV

A composition according to the present invention is made in the following manner. The following compounds in the stated weight percentages are admixed to form the first component of the composition of the present invention.

| | |
|---|---|
| JEFFAMINE D-2000 | ETHACURE 100 |
| 70 pbw | 30 pbw |

The resultant composition is a liquid material under ambient conditions and has a viscosity suitable for spraying processes.

The second component of the composition of the present invention comprises a liquid isocyanate composition comprising 95 wt. % RUBINATE 9009 and 5.0 wt. % JEFFSOL PC, and has a viscosity under ambient conditions suitable for spraying processes.

EXAMPLE V

A composition according to the present invention was made in the following manner. The following compounds in the stated weight percentages were admixed to form the first component:

| | Weight % |
|---|---|
| JEFFAMINE D-2000 | 48.0 |
| JEFFAMINE T-5000 | 25.0 |
| ETHACURE 100 | 25.2 |
| Titanium Dioxide | 1.0 |
| SILQUEST A-187 | 0.8 |
| | 100.0 |

The resultant composition was a liquid material under ambient conditions and had a viscosity suitable for spraying processes.

The second component of the composition of the present invention comprised a liquid isocyanate composition comprised of 95 wt. % RUBINATE 9009 and 5.0 wt. % JEFFSOL PC, and had a viscosity under ambient conditions suitable for spraying processes.

EXAMPLE VI

A composition according to the present invention is made in the following manner. The following compounds in the stated weight percentages are admixed to form the first component of the composition of the present invention.

| | Weight % |
|---|---|
| JEFFAMINE D-2000 | 20.5 |
| JEFFAMINE T-5000 | 22.0 |
| ETHACURE 100 | 24.5 |
| UNILINK 4200 | 12.2 |
| Calcium Carbonate | 20.0 |
| SILQUEST A-187 | 0.8 |
| | 100.0 |

The resultant composition is a liquid material under ambient conditions and has a viscosity suitable for spraying processes.

The second component of the composition of the present invention comprises a liquid isocyanate composition comprising 95 wt. % RUBINATE 9009 and 5.0 wt. % JEFFSOL PC, and has a viscosity under ambient conditions suitable for spraying processes.

EXAMPLE VII

A composition according to the present invention is made in the following manner. The following compounds in the stated weight percentages are admixed to form the first component of the composition of the present invention.

|  | Weight % |
|---|---|
| JEFFAMINE D-2000 | 30.0 |
| VORANOL 230-660 | 25.0 |
| ETHACURE 100 | 43.2 |
| Titanium Dioxide | 1.0 |
| SILQUEST A-187 | 0.8 |
|  | 100.0 |

The resultant composition is a liquid material under ambient conditions and has a viscosity suitable for spraying processes.

The second component of the composition of the present invention comprises a liquid isocyanate composition comprising 100 wt. % RUBINATE 9009, and has a viscosity under ambient conditions suitable for spraying processes.

EXAMPLE VIII

A composition according to the present invention is made in the following manner. The following compounds in the stated weight percentages are admixed to form the first component of the composition of the present invention.

|  | Weight % |
|---|---|
| JEFFAMINE D-2000 | 53.2 |
| ETHACURE 300 | 25.0 |
| SBR Crumb Rubber | 5.0 |
| Barium Sulfate | 15.0 |
| Titanium Dioxide | 1.0 |
| SILQUEST A-187 | 0.8 |
|  | 100.0 |

The resultant composition is a liquid material under ambient conditions and has a viscosity suitable for spraying processes.

The second component of the composition of the present invention comprises a liquid isocyanate composition comprising 95 wt. % RUBINATE 9009 and 5.0 wt. % JEFFSOL PC, and has a viscosity under ambient conditions suitable for spraying processes.

EXAMPLE IX

A composition according to the present invention is made in the following manner. The following compounds in the stated weight percentages are admixed to form the first component of the composition of the present invention.

|  | Weight % |
|---|---|
| JEFFAMINE D-2000 | 40.0 |
| JEFFAMINE T-5000 | 15.8 |
| UNILINK 4300 | 25.2 |
| Barium Sulfate | 18.0 |
| NIAX A-1 | 1.0 |
|  | 100.0 |

The resultant composition is a liquid material under ambient conditions and has a viscosity suitable for spraying processes.

The second component of the composition of the present invention comprises a liquid isocyanate composition comprising 100 wt. % RUBINATE 9009, and has a viscosity under ambient conditions suitable for spraying processes.

EXAMPLE X

A composition according to the present invention is made in the following manner. The following compounds in the stated weight percentages are admixed to form the first component of the composition of the present invention.

|  | Weight % |
|---|---|
| JEFFAMINE T-5000 | 62.0 |
| Ethylene Glycol | 10.0 |
| PPG 2000 | 15.2 |
| Barium Sulfate | 12.0 |
| SILQUEST A-187 | 0.8 |
|  | 100.0 |

The resultant composition is a liquid material under ambient conditions and has a viscosity suitable for spraying processes.

The second component of the composition of the present invention comprises a liquid isocyanate composition comprising 100 wt. % RUBINATE M, and has a viscosity under ambient conditions suitable for spraying processes.

EXAMPLE XI

A composition according to the present invention was made in the following manner. The following compounds in the stated weight percentages were admixed to form the first component:

|  | Weight (%) |
|---|---|
| JEFFAMINE D-2000 | 55.0 |
| ETHACURE 100 | 23.2 |
| Barium Sulfate | 15.0 |
| Fumed Silica | 5.0 |
| Titanium Dioxide | 1.0 |
| SILQUEST A-187 | 0.8 |
|  | 100.0 |

The resultant composition was a liquid material under ambient conditions and had a viscosity suitable for spraying processes.

The second component of the composition of the present invention comprised a liquid isocyanate composition comprised of 95 wt. % RUBINATE 9009 and 5.0 wt. % JEFFSOL PC, and had a viscosity under ambient conditions suitable for spraying processes.

EXAMPLE XII

A composition according to the present invention is made in the following manner. The following compounds in the stated weight percentages are admixed to form the first component of the composition of the present invention

| | Weight % |
|---|---|
| JEFFAMINE D-2000 | 69.2 |
| ETHACURE 100 | 30.0 |
| SILQUEST A-187 | 0.8 |
| | 100.0 |

The resultant composition is a liquid material under ambient conditions and has a viscosity suitable for spraying processes.

The second component of the composition of the present invention comprises a liquid isocyanate composition comprising 95 wt. % RUBINATE 9009 and 5.0 wt. % JEFFSOL PC, and has a viscosity under ambient conditions suitable for spraying processes.

EXAMPLE XIII

A composition according to the present invention is made in the following manner. The following compounds in the stated weight percentages are admixed to form the first component of the composition of the present invention.

| | Weight % |
|---|---|
| JEFFAMINE D-2000 | 57.0 |
| OLIN POLY G 55-173 | 12.9 |
| ETHACURE 300 | 15.0 |
| Water | 0.3 |
| Barium Sulfate | 10.0 |
| Titanium Dioxide | 1.0 |
| Red Oxide | 3.0 |
| SILQUEST A-187 | 0.8 |
| | 100.0 |

The resultant composition is a liquid material under ambient conditions and has a viscosity suitable for spraying processes.

The second component of the composition of the present invention comprises a liquid isocyanate composition comprising 95 wt. % RUBINATE 9009 and 5.0 wt. % JEFFSOL PC, and has a viscosity under ambient conditions suitable for spraying processes.

EXAMPLE XIV

A composition according to the present invention is made in the following manner. The following compounds in the stated weight percentages are admixed to form the first component of the composition of the present invention.

| | pbw |
|---|---|
| JEFFAMINE D-2000 | 20.5 |
| JEFFAMINE T-5000 | 22.0 |
| ETHACURE 100 | 24.5 |

-continued

| | pbw |
|---|---|
| UNILINK 4200 | 12.5 |
| CALCIUM CARBONATE | 19.5 |

The resultant composition is a liquid material under ambient conditions and has a viscosity suitable for spraying processes.

The second component of the composition of the present invention comprises a liquid isocyanate composition comprising 95 wt. % RUBINATE 9009 and 5.0 wt. % JEFFSOL PC, and has a viscosity under ambient conditions suitable for spraying processes.

While preferred embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

What is claimed is:

1. A method for damping Vibration of a substrate, comprising the step of:

applying a liquid material onto the substrate in an ambient environment, wherein, after application to the substrate, the material cures substantially instantaneously in the ambient environment;

wherein the liquid material is essentially organic and consists essentially of:

a first component consisting essentially of at least one polymer present in an amount sufficient to impart a predetermined amount of tensile strength, harness and flexibility, wherein the at least one polymer is selected from the group consisting of amine-terminated polyester diols, amine-terminated polyester triols, amine-terminated polyether diols, amine-terminated polyether triols, and mixtures thereof;

a second component, consisting essentially of at least one isocyanate compound, having at least one-NCO radical wherein at least one-NCO radical is reactive with the first component; and wherein the application occurs in a manner which produces a tight, well defined application pattern, the cured materia adhering to the substrate in a manner which attenuates vibration, noise and harshness transmitted through the substrate.

2. The method as defined in claim 1 wherein the ambient environment has a temperature ranging between about 35° F. (1.7° C.) and about 160° F. (71.1° C.).

3. The method as defined in claim 2 wherein the ambient environment has a temperature ranging between about 50° F. (10° C.) and about 120° F. (48.9° C.).

4. The method as defined in claim 1 wherein the ambient environment has a pressure ranging between about 730 mm Hg and about 800 mm Hg.

5. The method as defined in claim 4 wherein the ambient environment has a pressure ranging between about 750 mm Hg and about 780 mm Hg.

6. The method as defined in claim 1 wherein the material cures in an interval ranging between about 2 seconds and about 30 minutes.

7. The method as defined in claim 6 wherein the material cures in an interval ranging between about 15 seconds and about 20 seconds.

8. The method as defined in claim 1 wherein the substrate is at least one of a metal stamping, a body in white, carbon graphite composites, fiberglass, polycarbonates, ABS, and structural polymeric materials.

9. The method as defined in claim 8 wherein the substrate is a body in white.

10. The method as defined in claim 1 wherein the applying step is performed by at least one of spraying, dipping and brushing.

11. The method as defined in claim 10 wherein the applying step is performed by a high pressure, impingement mix spray system.

12. The method as defined in claim 9 wherein the vibration damped includes at least one of noise, vibration and harshness.

13. The method as defined in claim 1 wherein the first component further consists essentially of:
- at least one chain extender present in an amount sufficient to impart a predetermined amount oftensile strength, weatherability, flexibility, adhesion to specific substrates, and hardness; and
- at least one filler present in an amount sufficient to impart a predetermined amount of hardness, flexibility, and specific vibration blocking characteristics to the substrate.

14. The method as defined in claim 13 wherein the first component further consists essentially of:
- a colorant compound selected from the group consisting of carbon black, titanium dioxide, iron oxide, organic pigments, dyes, and mixtures thereof; and
- a catalyst selected from the group consisting of tertiary amines, organometallic catalysts, and mixtures thereof.

15. The method as defined in claim 1 wherein the at least one polymer of the first component further comprises at least one additional polymer selected from the group consisting of hydroxyfunctional polyols, polyoxypropylene dials, polyoxypropylene trials, di-, tri-, quad- or penta-functional polyester polyols, di-, tri-, quad- or penta-functional poryether polyols, and mixtures thereof, wherein the at least one additional polymer is present in blended relationship to the amine-terminated material.

16. The method as defined in claim 1 wherein the isocyanate compound consists essentially of isocyanate quasi-prepolymers based on a uretonimine modified MDI and a high molecular weight polyether polyol having an isocyanate content of about 15.8% and a 2, 4'- isomer content of less than about 10%.

17. The method as defined in claim 1 wherein the second component further consists essentially of at least one plasticizer present in an amount sufficient to impart a predetermined amount of flexibility.

18. The method as defined in claim 17 wherein the plasticizer consists essentially of alkylene carbonates selected from the group consisting of ethylene carbonates, propylene carbonates, butylene carbonates, dimethyl carbonates, and mixtures thereof.

19. A method for damping vibration of a substrate, comprising the step of:
- applying a liquid material onto the substrate in an ambient environment, wherein, after application to the substrate, the material cures substantially instantaneously in the ambient environment;
- wherein the liquid material is essentially organic and consists essentially of:
  - a first component consisting essentially of:
    - at least one polymer present in an amount sufficient to impart a predetermined amount of tensile strength, harness and flexibility wherein the at least one polymer comprises a material selected from the group consisting of amine-terminated polyester diols, amine-terminated polyester triols, amine-terminated polyether diols, amine-terminated polyether trials, and mixtures thereof, having a molecular weight between about 1000 and about 6000;
    - at least one chain extender present in an amount sufficient to impart a predetermined amount of tensile strength, weatherability, flexibility, adhesion to specific substrates, and hardness, wherein the at least one chain extender is selected from the group consisting of dialkyl substituted methylone dianilines, diethyltoluene diamines, and mixtures thereof;
    - at least one filler present in an amount sufficient to impart predetermined amount of hardness, flexibility, and specific vibration blocking characteristics to the substrate wherein the at least one filler is selected from the group consisting of barium sulfate, calcium carbonate, clay, talc, aluminum silicate, titanium dioxide, nitrile rubbers, butyl rubbers, synthetic rubbers, chopped fiberglass, calcium metasilicate, fibers, fumed silica, and mixtures thereof; and
  - a second component, consisting essentially of at least one isocyanate compound, having at least one-NCO radical wherein at least one-NCO radical is reactive with the first component; and
- wherein the application occurs in a manner which produces a tight, well defined application pattern, the cured materia adhering to the substrate in a manner which attenuates vibration, noise and harshness transmitted through the substrate.

20. The method as defined in claim 19 wherein the first component of the composition further consists essentially of at least one adhesion promoter, wherein the adhesion promoter comprises an organosilane compound.

21. A method for damping vibration of a substrate, the substrate being at least one of a metal stamping, a body in white, carbon graphite composites, fiberglass, polycarbonates, ABS, and structural polymeric materials, the method comprising the step of:
- applying substantially organic a liquid material by at least one of spraying, dipping and brushing onto the substrate in an ambient environment, the ambient environment having a temperature ranging between about 35° F. (1.7° C.) and about 160° F. (71.1° C.), wherein, after application to the substrate, the material cures in an interval ranging between about 15 seconds and about 20 seconds;
- wherein the substantially organic liquid material consists essentially of:
  - a first component, consisting essentially of at least one polymer present in an amount sufficient to impart a predetermined amount of tensile strength, hardness and flexibility, wherein the at least one polymer is selected from the group consisting of amine-terminated polyester diols, amine-terminated polyester triols, amine-terminated polysther dio)s, amine-terminated polyether triols, and mixtures thereof; and
  - a second component, consisting essentially of at least one isocyanate compound, having at least one-NCO radical wherein at least one -NCO radical is reactive with the first component.

22. The method as defined in claim 21 wherein the first component further consists essentially of:

at least one chain extender present in an amount sufficient to impart a predetermined amount of tensile strength, weatherability, flexibility, adhesion to specific substrates, and hardness; and at least one filler present in an amount sufficient to impart a predetermined amount of hardness, flexibility, and specific vibration blocking characteristics to the substrate.

23. The method as defined in claim 21 wherein the at least one polymer of the first component further comprises at least one additional polymer selected from the group consisting of hydroxy functional polyols, polyoxypropylene diols, polyoxypropylene triols, di-, tri-, quad- or penta-functional polyester polyols, di-, tri-, quad- or penta-functional polyether polyols, and mixtures thereof, wherein the at least one additional polymer is present in blended relationship to the amine-terminated material.

24. The method as defined in claim 23 wherein the isocyanate compound consists essentially of isocyanate quasi-prepolymers based on a uretonimine modified MDI and a high molecular weight polyether polyol having an isocyanate content of about 15.8% and a 2,4'-isomer content of less than about 10%.

25. The method as defined in claim 24 wherein the second component further consists essentially of at least one plasticizer present in an amount sufficient to impart a predetermined amount of flexibility.

26. The method as defined in claim 25 wherein the plasticizer consists essentially of alkylene carbonates selected from the group consisting of ethylene carbonates, propylene carbonates, butylene carbonates, dimethyl carbonates, and mixtures thereof.

27. A method for damping vibration of a substrate, the substrate being at least one of a metal stamping, a body in white, carbon graphite composites, fiberglass, polycarbonates, ABS, and structural polymeric materials, the method comprising the step of:

applying substantially organic a liquid material by at least one of spraying, dipping and brushing onto the substrate in an ambient environment, the ambient environment having a temperature ranging between about 35° F. (1.7° C.) and about 160° F. (71.1° C.), wherein, after application to the substrate, the material cures in an interval ranging between about 2 seconds and about 30 minutes;

wherein the substantially organic liquid material consists essentially of:

a first component, consisting essentially of at least one polymer present in an amount hardness and flexibility wherein the at least one polymer comprises a material selected from the group consisting of amine-terminated polyester diols, amine-terminated polyester triols, amine-terminated polyether diols, amine-terminated polyether triols, and mixtures thereof, having a molecular weight between about 1 000 and about 6000;

at least one chain extender present in an amount sufficient to impart a predetermined amount of tensile strength, weatherability, flexibility, adhesion to specific substrates, and hardness, wherein the at least one chain extender is selected from the group consisting of dialkyl substituted methylene dianilines, diethyltoluene diamines, and mixtures thereof; and at least one filler present in an amount sufficient to impart a predetermined amount of hardness, flexibility, and specific vibration blocking characteristics to the substrate, wherein the at least one chain extender is selected from the group consisting of dialkyl substituted methylene dianilines, diethyltoluene diamines, and mixtures thereof; and a second component, consisting essentially of at least one isocyanate compound, having at least one-NCO radical wherein at least one-NCO radical is reactive with the first component, wherein the isocyanate compound consists essentially of isocyanate quasi-prepolymers based on a uretonimine modified MDI and a high molecular weight polyether polyol having an isocyanate content of about 15.8% and a 2,4'-isomer content of less than about 10%; and at least one plasticizer present in an amount sufficient to impart a predetermined amount of flexibility.

28. The method as defined in claim 27 wherein the first component further consists essentially of:

a colorant compound selected from the group consisting of carbon black, titanium dioxide, iron oxide, organic pigments, dyes, and mixtures thereof; and a catalyst selected from the group consisting of tertiary amines, organometallic catalysts, and mixtures thereof.

29. The method as defined in claim 28 wherein the first component of the composition further consists essentially of at least one adhesion promoter, wherein the adhesion promoter comprises epoxy silane compounds.

* * * * *